US006735552B2

United States Patent
Franke et al.

(10) Patent No.: US 6,735,552 B2
(45) Date of Patent: May 11, 2004

(54) METHOD OF RECOGNIZING AND CORRECTING ERRORS

(75) Inventors: Steffen Franke, Brentwood (GB); Kristina Eberle, Hardthof (DE); Carsten Kluth, Stuttgart (DE); Detlef Heinrich, Ludwigsburg (DE); Thomas Edelmann, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 09/980,140

(22) PCT Filed: Apr. 5, 2001

(86) PCT No.: PCT/DE01/01314

§ 371 (c)(1),
(2), (4) Date: Mar. 1, 2002

(87) PCT Pub. No.: WO01/77511

PCT Pub. Date: Oct. 18, 2001

(65) Prior Publication Data

US 2002/0116150 A1 Aug. 22, 2002

(30) Foreign Application Priority Data

Apr. 8, 2000 (DE) .......................................... 100 17 543

(51) Int. Cl.[7] ................................................ G06F 11/30
(52) U.S. Cl. ........................ 702/185; 702/185; 702/183; 702/107; 702/58; 714/764; 714/798; 327/292; 327/63; 327/72
(58) Field of Search ............................. 702/58, 59, 85, 702/107, 117, 183, 185, 189, FOR 103, 104, 134, 170, 171; 714/701, 703, 758, 798, 799, 811, 824; 327/292, 58–60, 68, 72

(56) References Cited

U.S. PATENT DOCUMENTS

| 5,964,811 A | * | 12/1999 | Ishii et al. ..................... 701/29 |
| 6,226,576 B1 | * | 5/2001 | Torno et al. ................... 701/34 |
| 2002/0077782 A1 | * | 6/2002 | Fruehling et al. ........... 702/185 |

FOREIGN PATENT DOCUMENTS

| DE | 43 26 498 A | 3/1994 |
| DE | 195 45 649 A | 7/1996 |
| DE | 198 29 621 A | 1/2000 |

OTHER PUBLICATIONS

Leonhardt et al., Methods of Engine Supervision and Control based on Cylinder Pressure Information, Jan. 1999, DUOT, pp. 1–15.*
Douville et al., Performance and Emissions of a Two–Stroke Engine Fueled Using High–Pressure Direct Injection of Natural Gas, Jan. 1998, Westport Research Inc., pp. 1–8.*

* cited by examiner

Primary Examiner—Marc S. Hoff
Assistant Examiner—Elias Desta
(74) Attorney, Agent, or Firm—Michael J. Striker

(57) ABSTRACT

A method for error detection and error correction in the monitoring of measurement values is disclosed, in which the value to be tested is checked for plausibility in an evaluation device, for example a computer, and in the event that an implausibility is identified, the existence of an error is determined. If a further check finds that the error no longer exists, then an error correction takes place. A prerequisite for the error correction, however, is that the range of the value to be monitored in which the error has occurred is also the range in which a current error is no longer occurring. In an expanded method, a differentiation is also made between different errors and an error correction is only possible if it involves the same type of error.

8 Claims, 3 Drawing Sheets

METHOD OF RECOGNIZING AND CORRECTING ERRORS

Figure 1:
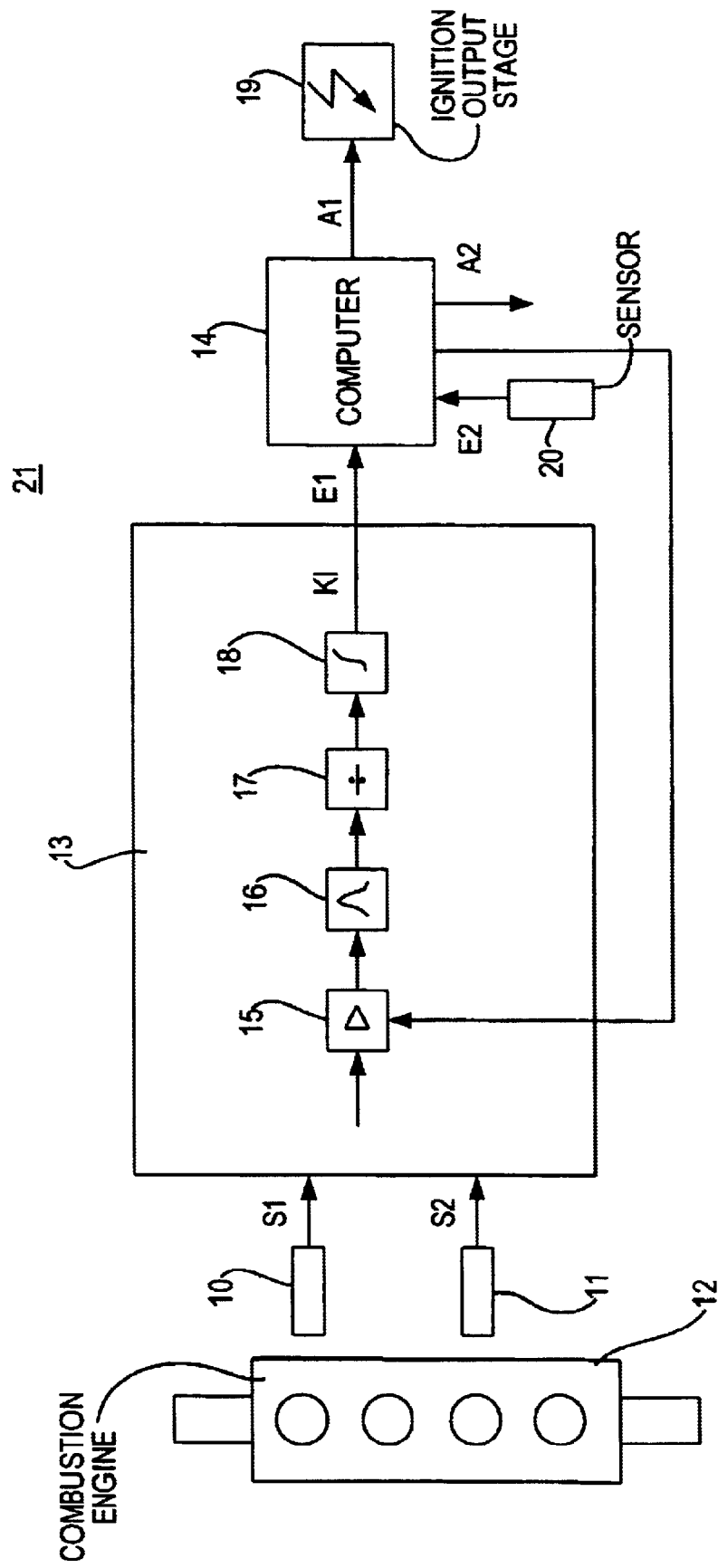

The invention relates to a method for error detection and error correction, in particular in a diagnostic device in connection with a knock detection in an internal combustion engine, according to the preamble to the main claim.

PRIOR ART

It is known that in various devices, a diagnosis is carried out in which the components or signals supplied by components or sensors are tested for plausibility and in the course of such a plausibility test, a determination is made as to whether or not an error exists. When an error is detected, a substitute measure is activated or a substitute value is used in place of the measured value. An error that was detected once can also be recognized as corrected, i.e. the error was detected at an earlier point in time, but no is longer present. In this instance, the substitute measure is usually also deactivated.

In known diagnostic functions which are executed, for example, in the control unit of an internal combustion engine, values that are essential to regulating the engine are monitored for plausibility. For example, these values are signals supplied by sensors. An error is detected if the signal to be tested or a signal derived from it either exceeds or falls below a threshold. There is thus no error if the signal is within the permissible range. The threshold in this connection does not have to be fixed, but can be stored in a memory of the control unit as a characteristic field or a characteristic curve that depends on different operating points of the engine. In plausibility tests of this kind, it can be the case that an existing error is detected in one operating point, but not in another. This results in a detected error being recognized as corrected in the second operating point since is not present in this operating point. The substitute measure is then deactivated again although the error still exists in the first operating point. In addition, a plausibility test of this kind does not differentiate between error types.

A method for error detection and error correction which carries out a more extensive analysis has been disclosed by DE-P 197 560 81.4. In this known method for error detection and error correction, which relates to the monitoring of the functionality of a knock detection device in an internal combustion engine, the knock detection and the error correction are executed based on two different testing methods. In a first testing method, a so-called 0 test is executed in which no signal is sent to the evaluation circuit and in a second test, a test pulse is introduced. In both tests, the reaction of the system is evaluated. If one of the two diagnostic functions raises the suspicion of an error, a deviation from the usually alternating diagnosis is initiated and the diagnosis indicating the error is repeated. In the error correction, a similar procedure is executed and the method that led to the error correction is first repeated before a final error correction is recognized.

ADVANTAGES OF THE INVENTION

The method for error detection and error correction according to the invention has the advantage that a particularly reliable and dependable error detection is possible and also in particular, a reliable error correction is possible, in which incorrect recognitions of error correction are prevented. These advantages are achieved by the method for error detection and error correction according to the invention with the features of claim 1. To that end, the signal to be evaluated, a characteristic curve, or the error detection and error correction themselves are divided into different ranges and the error detection itself is permitted in each range; the error correction, however, is only registered if the error and the no longer existing error, i.e. the error correction, have occurred in the same range. Advantageously, the ranges are associated with different operating points. An error detection is then possible in each operating point. The error correction, however, is only permissible if the second operating point is disposed in the same operating range as the first operating point.

Other advantages of the invention are achieved by means of the measures disclosed in the dependent claims. In this connection, it is particularly advantageous to set up the operating ranges based on characteristic curves and/or characteristic fields. Characteristic curves or characteristic fields of this kind can, for example, be an error detection threshold which is given as a function of the operating point and the operating point, in turn, is a function of values of the internal combustion engine, for example the speed, the load, the temperature etc. If the sensor signal or a signal derived from it exceeds the error detection threshold, for example, then an error is detected The possibility of differentiating between error types represents another particular advantage of the invention. Since an error correction is only registered if the error type and the operating point in which the error no longer occurs coincide with each other, a particularly reliable error correction is achieved in which incorrect error detections and incorrectly recognized error corrections are prevented to the greatest extent possible.

DRAWINGS

Figure 2:
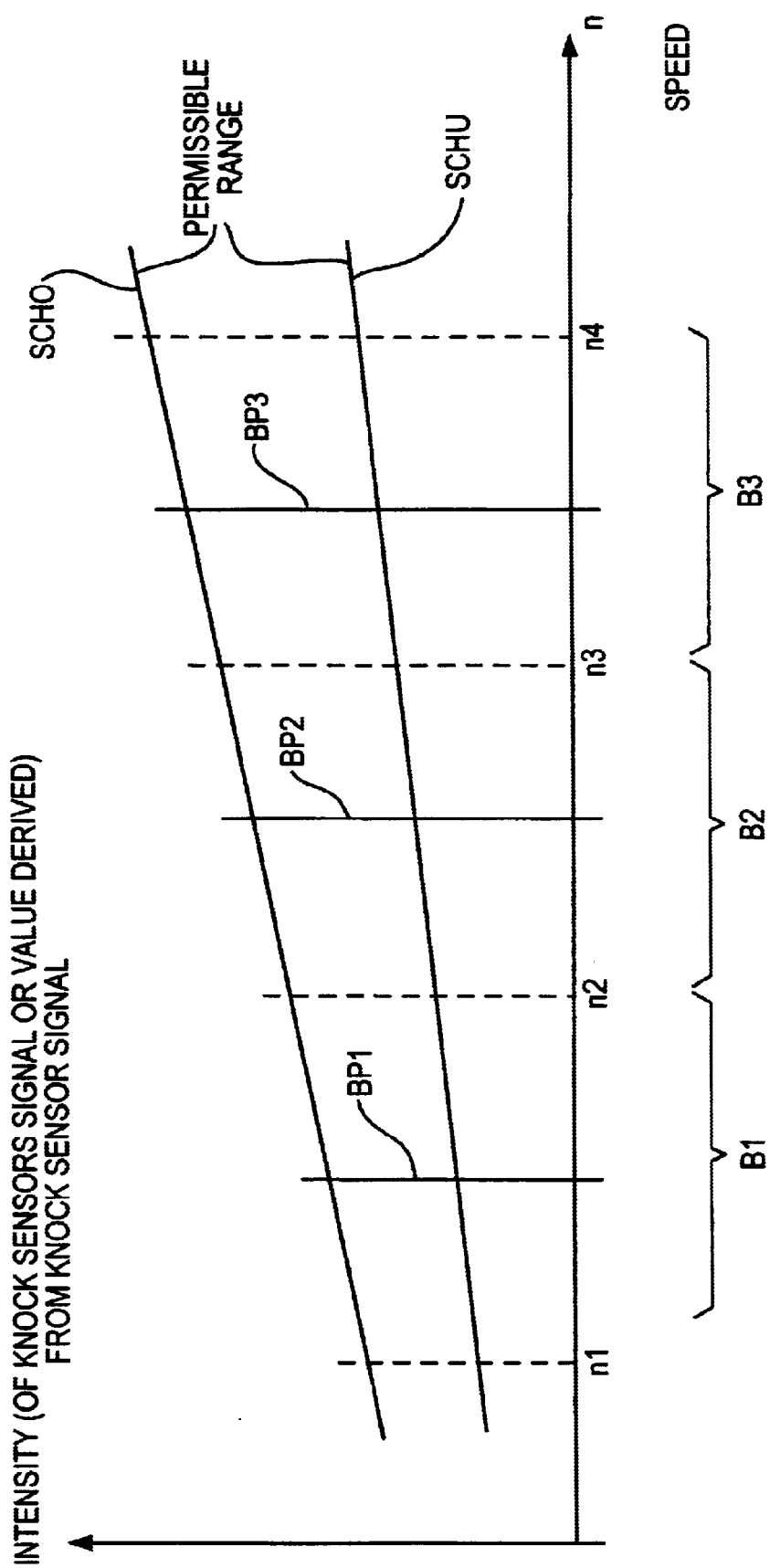

The two figures of the drawings show two exemplary embodiments of the invention. A first exemplary embodiment relates to an error detection and error correction in a device for knock detection in an internal combustion engine, which is schematically depicted in FIG. 1. FIG. 2 shows the course of the permissible range for the output signal of the knock sensor and for a value (J) derived from it (e.g. the reference level) over the speed (n) for the exemplary embodiment according to FIG. 1. This signal progression can be evaluated for the error detection and error correction according to the invention. The other exemplary embodiment according to FIG. 3 relates to the evaluation of the position of the camshaft in an internal combustion engine in which in the final step, the deviation of the reference angle from the actual angle is tested for the error detection and error correction. The precise procedures will be explained in detail in the description that follows.

DESCRIPTION

FIG. 1 shows a device for knock detection in an internal combustion engine in which a method for error detection and error correction according to the invention can be executed. The diagnostic functions are executed in the control unit 15 of the engine.

The exemplary embodiment for a device for knock detection in an internal combustion engine indicated in FIG. 1 contains two knock sensors 10, 11, which are associated with predeterminable cylinders of an internal combustion engine 12 and emit signals S1 and S2. These knock sensors 10, 11 are connected via an evaluation circuit 13 to the input E1 of a computer 14 that is a component of a control unit 15, which is not shown in detail and is associated with the internal combustion engine. The evaluation circuit 13 itself can also be a component of the control unit. The method according to the invention is executed in the control unit.

In the exemplary embodiment according to FIG. 1, the actual knock detection takes place in the computer 14. The evaluation circuit 13 includes an amplifier 15 with an adjustable amplification factor, which is alternatingly supplied with the output signals S1 and S2. In a subsequent band pass 16, the amplified signals are filtered so that preferably the signals typical of knocking are forwarded further. The band pass is connected to a rectifier 17 whose output signals are integrated, for example in the integrator 18. The integrated signals KI are supplied to the computer in which a reference signal is generated. The generation of the reference signal will not be described explicitly here. If the integral KI exceeds the reference signal in a predeterminable manner, then knocking is detected. Other signals that depend on the operating state of the engine are taken into consideration in the generation of the reference signal.

Via an input E2, the computer 14 can also be supplied with other signals which characterize the operating state of the engine, for example. A signal of this kind can, for example, be the speed n of the engine, the gas pedal position, or the intake air mass, etc. These signals are measured with the aid of suitable sensors (20) and after a suitable preparation, are evaluated by the computer 14 for purposes of knock detection, error detection, and error correction. Depending on the output signals of the evaluation circuit 13 and the other signals that are supplied to the input E2, the computer 14 regulates the ignition output stage 19 of the engine 12 and/or possibly other devices of the engine, for example by outputting corresponding signals at the output A1 or A2. The computer 14 is associated with the required storage means which are not explicitly indicated in the drawings, which store characteristic fields or characteristic curves that are required for the knock detection. The knock detection is usually executed so that knocking is detected if the prepared signal exceeds a predeterminable, in particular variable, threshold or reference value.

For example, the additional error detection executed takes place so that an error is detected if the signal to be tested—the measurement value or a value derived from it, for example a reference value—exceeds or undershoots another threshold, e.g. an upper threshold or a lower threshold. However, there is no error if the signal is within the permissible range. The threshold is inferred in a characteristic field or a characteristic curve as a function of the operating point, for example as a function of the speed, the load, or the temperature, etc. FIG. 2 shows an example of a permissible range for the knock sensor signal that can be changed as a function of speed. The permissible range in this case is delimited by an upper threshold SCHO and a lower threshold SCHU.

The error detection and the subsequent error correction are supplemented by the measures described below. The error correction in this connection is limited and is only permitted under certain marginal conditions. To that end, the characteristic fields and characteristic curves are divided into ranges B1, B2, B3, . . . and the error correction is only permitted for the range in which the error was also detected. The type of error can also be taken into account here. An error is thus only corrected if the error type also matches. This method prevents a vertical line BP1 of correctly detected errors in the operating point from being erroneously considered corrected in an operating point BP2 and in need be, prevents the substitute measures from being canceled again. The method according to the invention can thus prevent a correctly detected error in one operating point from being erroneously identified as corrected in another operating point since the error did not occur in this operating point. The error detection and error correction according to the invention can occur not only for the sensor output signal itself, but also for values derived from it, for example the reference value.

The concrete procedure in the error detection and error correction will be explained in conjunction with the examples described in detail below.

Exemplary Embodiment 1

In the operating point 1 and range 1 of the diagnostic characteristic field, an existing error can be correctly detected. In the operating point 2 and range 2 of the diagnostic characteristic field, the existing error cannot be detected.

Under these conditions, the error is detected in the operating point BP1 and a substitute measure is activated. With regard to the exemplary embodiment of knock detection, for example, an error of the knock sensor is detected and the advance angle is set not as a function of the output signal of the sensor, but as a function of a predeterminable substitute value. After the error detection, the operating point is changed. In the operating point BP2, the error cannot be detected. The error correction, however, is blocked because the error detection took place in the range B1. The error thus remains detected and the substitute measure remains active. If the error should disappear during the course of further operation, then an error correction cannot take place in the current operating point BP2 since the error detection took place in the range 1. It is only after a changeover into the operating point BP1, when an error no longer exists, that an error correction takes place and the substitute measure is canceled. This procedure can also be extended to other ranges. In each range, a determination can be made as to whether the error was detected in the same range. If it was, then in this instance as well, the error correction can only take place within this range. But the error correction can take place in any range in which an error has been detected and not only in the range in which the error first occurred and was discovered.

Exemplary Embodiment 2

In the operating point BP1 and operating point BP3, i.e. in the ranges B1 and B3 of the diagnostic characteristic field, an existing error can be correctly detected. In the operating point BP2 and range B2 of the diagnostic characteristic field, however, the existing error cannot be detected.

In this instance, in the operating point BP1, the error is detected and a substitute measure is activated. Then there is a changeover into the operating point BP2. There, the error according to the example given cannot be detected. The error correction is thus blocked because the error detection took place in the range B1. The error consequently remains recognized and the substitute measure remains active while within the operating point BP2. With a subsequent changeover into the operating point BP3, the error can be detected. Since the error was already detected in range B1 and the substitute measure is already active, the only thing that needs to be noted is that the error was also detected in range B3 and the error correction is permitted in this range. Then there is a changeover back into the operating point BP2. If the error disappears again in the course of further operation, the error correction cannot take place in the current operating point BP2 since the error was detected in range B1. However, since an error detection also took place in range B3, an error correction can only take place and the substitute measure can only be canceled after a changeover into operating point BP1 or operating point BP3. The error correction in the operating point BP3 is possible in this example because the error had also been detected there, i.e. in the operating range B3; if the operating point BP3 had not been started in the event of an existing error, the error correction would not have been permitted to take place in this range.

In addition to the ranges, the error type can also be taken into account in the error correction. An error correction in a range is permitted to take place only if the error in the range was identified as being of the same error type. In this instance, it is not enough to merely detect the error within the same range. Only when the error range and error type coincide is an error correction possible; otherwise, the error correction is blocked and the substitute measure remains active.

Exemplary Embodiment 3

Taking the error type into account in the error correction will be explained in detail in example 3. A prerequisite in example 3 is that the signal to be monitored lie between two thresholds SCHO and SCHU. If the signal exceeds the upper threshold, an error of the MAX error type is detected. If the signal falls below the lower threshold, then an error of the MIN error type is detected. In the operating point BP1, i.e. in range B1, both the MIN error and the MAX error can be detected. In the operating point BP2, however, only the MIN error can be detected.

In the operating point BP1, the signal falls below the lower threshold, the error is detected as being of the MIN error type, and a substitute measure is activated. Then there is a changeover into the operating point BP2. There, the error is likewise detected as being of the MIN error type. The error thus remains detected and the substitute measure remains active. With a subsequent changeover into the operating point BP1, the signal changes and now exceeds the upper threshold. In this operating point, an error is once again detected, but now as the MAX error type; with a subsequent changeover into the operating point BP2, this error can no longer be detected, but an error correction does not take place because in the range B1, the error was detected as being of the MAX error type. But only the MIN error was previously detected in the operating point BP2 and so an error correction is not possible. If in the course of further operation, the error disappears again, the error correction cannot occur in the current operating point BP2 because of the error type. It is only after a changeover into the operating point 1 that the error correction takes place and the cancellation of the substitute measure is canceled.

The invention has been explained above in conjunction with a knock detection device, but the method according to the invention can also be used for other error detections. In connection with an error detection and error correction in an internal combustion engine, the method according to the invention is executed in the computer of the control unit of the engine.

Figure 3:
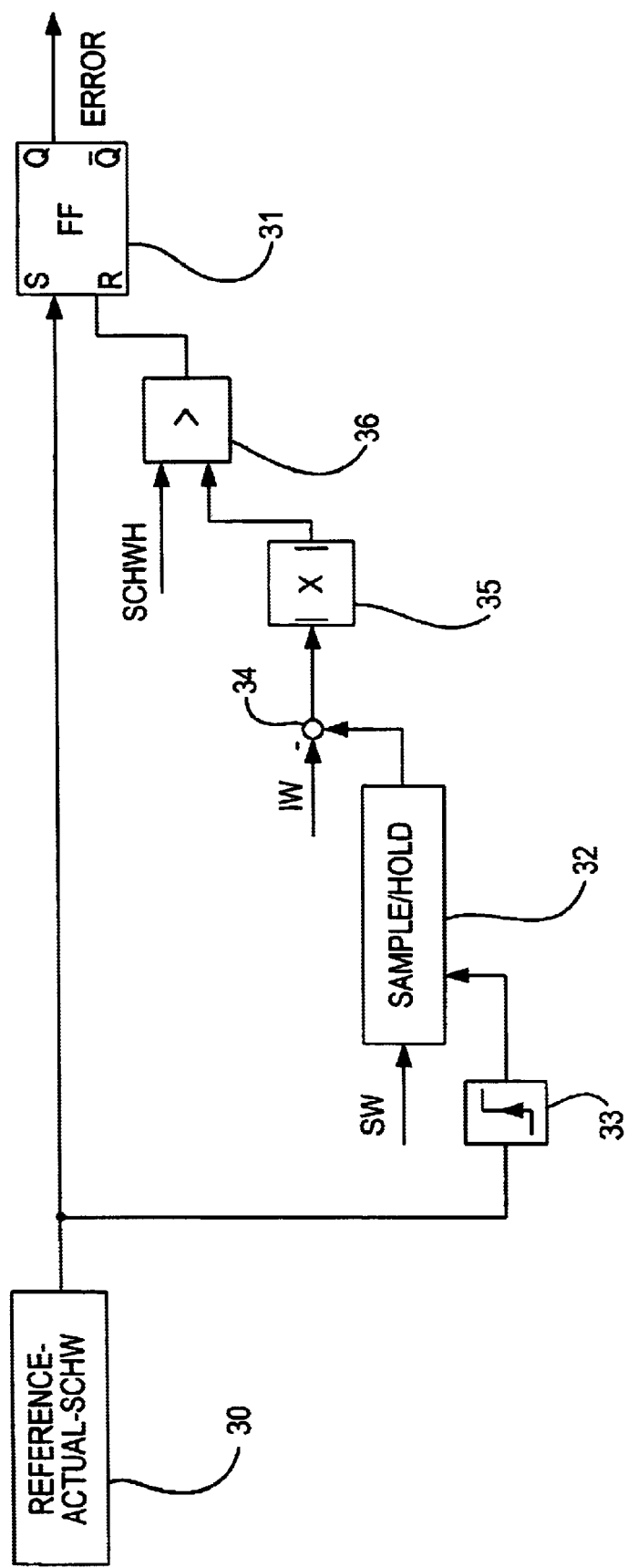

The example given in FIG. 3 for error correction of components as a function of operating point corresponds in principle to exemplary embodiment 3. It is shown for the evaluation of the position of a camshaft in an internal combustion engine. In an evaluation of this kind, when a defective state of a component is detected, depending on the operating point, for example the reference value of the component, the error is stored as a MAX error, a MIN error, or an NP error and the component is diagnosed as being defective. MAX and MIN mean that a tolerable threshold has been exceeded or undershot and NP signifies a zero point error.

Upon exiting the operating point, though, an error correction can once again take place, although the component remains defective. For example, this applies to a sticking camshaft in late striking mode.

In order for such an erroneous error correction to be reliably prevented, when a defective state of a component is detected, the error is stored as a MAX, MIN, or NP error, depending on the current operating point. In addition, the operating point is stored and the component is diagnosed as defective. The error is only permitted to be deleted if on the one hand, the operating point in which the error was detected is current and on the other hand, the defective state which led to the identification of the error no longer exists. For an error correction, it is particularly necessary that the same error (MAX, MIN, or NP error) no longer exist.

Such an error correction of components as a function of operating point is realized by virtue of the fact that in the block 30, a comparison of the reference value to the actual value takes place and the comparison result is compared to a threshold SCHW. If the difference between the reference value and the actual value is greater than the threshold SCHW, then an error is detected and the input S of a flip/flop 31 is correspondingly triggered. At the same time, when an error is detected, the reference value SW present in the sample-hold element 32 at this time is forwarded further by means of triggering 33. In the comparator 34, this reference value is compared to the actual angle measured. In block 35, the comparison result yields the amount which is compared to another threshold SCHWH in the comparator 36. If the result of this comparison is that the difference between the reference value and the actual angle is greater than the threshold SCWH, then the error still exists and the input R of the flip/flop 31 is supplied with a corresponding signal that retains the detected error. By contrast, if the amount is less than the threshold SCHWH, then an error correction takes place, i.e. the error signal disappears at the output of the flip/flop 31.

What is claimed is:

1. A method for error detection and error correction in the monitoring of values, in which the values are tested for plausibility in an evaluation device and in which when there is an implausibility, an error is detected and when predetermined conditions are met, an error correction occurs, characterized in that there is a division into at least two ranges of operating conditions of the internal combustion engine, an error detection is executed in each range of operating conditions of the internal combustion engine, and an error correction of a detected error is only permitted in the range of operating conditions of the internal combustion engine in which the error was previously detected.

2. The method for error detection and error correction according to claim 1, wherein the error detection takes place if predetermined thresholds are exceeded (MAX error) or undershot (MIN error) or a zero point position is implausible, where the thresholds are produced based on characteristic fields or characteristic curves and the characteristic fields or characteristic curves are divided into ranges.

3. The method for error detection and error correction according to claim 1, wherein errors with different error types are detected and an error correction is only permitted if the error in the range was identified as being of the same error type and the error no longer exists.

4. The method for error detection and error correction according to claim 1, wherein when an error is detected, a substitute value is generated for the measurement value and remains present until an error correction has been recognized.

5. The method for error detection and error correction according to claim 1, wherein at least one other additional range is defined in which neither an error detection nor an error correction is executed.

6. A device for error detection and error correction, with at least one computer device in which the method for error detection and error correction according to claim 1 is executed.

7. A device for error detection and error correction, having means for calculating the difference between reference value and actual value (30), which are connected to the set input of a flip/flop (31) and via a trigger means 33, forward the reference value stored in a sample-and-hold device 32 to a comparison means (34), which calculates the difference between the actual value and the reference value, having a value generator (35) which generates the amount of this difference and a threshold step in which this amount is compared to a threshold SCHWH, where the output of this comparator is connected to the R input of the flip/flop (31) and this is supplied with a signal that deletes errors possibly present at the output of the flip/flop (31).

8. A method for error detection and error correction in the monitoring of values of an internal combustion engine, in which the values are tested for plausibility in an evaluation device and in which when there is an implausibility, an error is detected, wherein the error detection takes place if predetermined thresholds are exceeded (MAX error) or undershot (MIN error) by the values, wherein the thresholds are produced based on characteristic fields or characteristic curves dependant on operating conditions of the internal combustion engine, wherein the characteristic fields or characteristic curve comprise at least two ranges of operating conditions, wherein an error correction is only permitted in the range of operating conditions in which the error was previously detected and the predetermined thresholds are no longer exceeded (MAX error) or undershot (MIN error) by the values.

* * * * *